United States Patent [19]

Blanchard et al.

[11] Patent Number: 5,703,903
[45] Date of Patent: Dec. 30, 1997

[54] METHOD AND APPARATUS FOR ADAPTIVE FILTERING IN A HIGH INTERFERENCE ENVIRONMENT

[75] Inventors: Scott David Blanchard; Kurt Albert Kallman, both of Mesa; William Alexander Bucher, Tempe, all of Ariz.

[73] Assignee: Motorola, Inc., Schaumburg, Ill.

[21] Appl. No.: 509,684

[22] Filed: Jul. 31, 1995

[51] Int. Cl.$^6$ .................................................. H04B 1/10
[52] U.S. Cl. ........................... 375/232; 375/233; 375/350
[58] Field of Search ...................................... 375/229, 230, 375/231, 232, 233, 234, 236, 350; 364/724.2; 455/307

[56] References Cited

U.S. PATENT DOCUMENTS

| | | | |
|---|---|---|---|
| 4,747,068 | 5/1988 | Voorman et al. | 375/232 |
| 4,768,205 | 8/1988 | Nakayama | 375/232 |
| 4,905,254 | 2/1990 | Bergmans | 375/233 |

*Primary Examiner*—Don N. Vo
*Attorney, Agent, or Firm*—Bradley J. Botsch, Sr.

[57] ABSTRACT

A method and apparatus for performing adaptive filtering in a high interference environment, such as for a radio, modem, or local area network. The adaptive filtering simultaneously provides interference excision while canceling resultant distortion in the signal caused by synthesizing the notch used to excise the interfering signal. An input signal (13) is pre-filtered (14) and the pre-filtered signal (15) is processed by a rejection filter (12) which combines weighted delayed versions of the pre-filtered signal (40, 42, 44, 46, 48, 50), weighted delayed versions of data decisions corresponding to the same delays as that used in the pre-filtered signal (60, 62, 64, 66, 68, 70), and a post filtered signal (27) to produce the filtered signal (19). The filtered signal (19) is processed by a data and coefficient estimator (18) to provide data decisions (25) and tap weight values (21, 23).

15 Claims, 6 Drawing Sheets

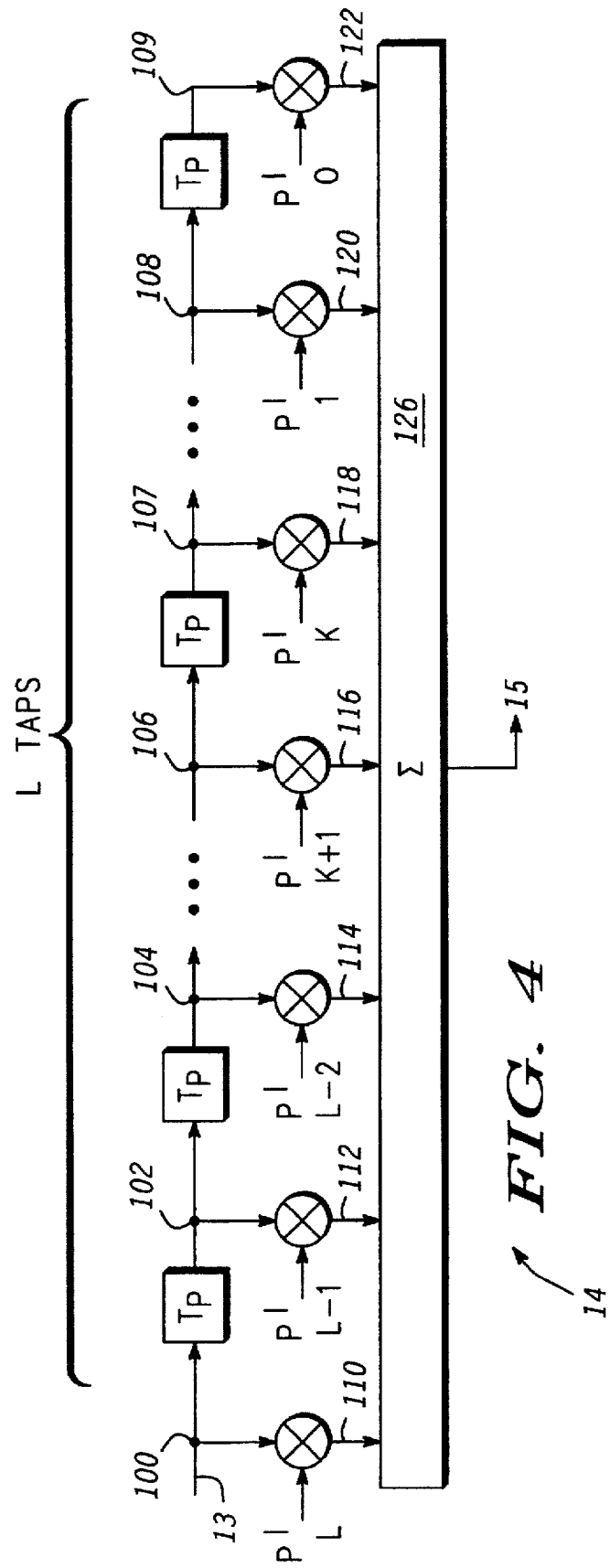

METHOD AND APPARATUS FOR ADAPTIVE FILTERING IN A HIGH INTERFERENCE ENVIRONMENT

FIELD OF THE INVENTION

This invention relates generally to adaptive filters, and more particularly to adaptive filters used to improve performance in high interference environments.

BACKGROUND OF THE INVENTION

The ability to operate in the presence of interference is important in modern digital communication systems. There are many potential causes of the interference. A system may be required to share spectrum with other users, interference may be intentionally generated outside the system as in the case of jamming, or interference may be present due to background noise as in the case of telephone lines or factory local area networks.

Making a communication system tolerant to interference provides several benefits. An interference tolerant system can make more efficient use of spectrum by being able to share that spectrum with multiple users. Such a system also provides more reliable communications supporting higher transfer rates while utilizing the same bandwidth and power.

One method of providing an interference tolerant communication system is through the use of a classical adaptive filter using various adaptation strategies to autonomously build a filter to excise any interference present. The ability of such an approach is limited, however, due to required distortion of the signal. A classical adaptive filter will excise the interference only to the extent that the distortion added through the use of the filter does not degrade the signal more than the interference itself. Such a filter cannot completely eliminate the interference.

Thus, what is needed is an adaptive filter and associated method for adapting such a filter to a stable operating point, where the adaptive filter should have the ability to cancel at least a portion of the distortion produced when excising the interference.

BRIEF DESCRIPTION OF THE DRAWINGS

In FIG. 4, there is shown a block diagram of the pre-filter for use in an adaptive interference canceling filter such as that of FIG. 1;

DETAILED DESCRIPTION OF THE PREFERRED EMBODIMENT

The following describes a method and apparatus for performing adaptive filtering in a high interference environment, simultaneously providing interference excision while canceling the resultant distortion in a signal caused by synthesizing the notch used to excise the interfering signal. As is described in detail below, an unfiltered signal is pre-filtered and the pre-filtered signal is processed by a rejection filter which combines weighted delayed versions of the pre-filtered signal, weighted delayed versions of data decisions corresponding to the same delays as that used in the pre-filtered signal, and a post filtered signal to produce the filtered signal. The filtered signal is processed by a data and coefficient estimator to provide data decisions and tap weight values. This adaptive filtering method and apparatus can be used in many high interference environments including radio, modems, and local area networks.

Figure 1:
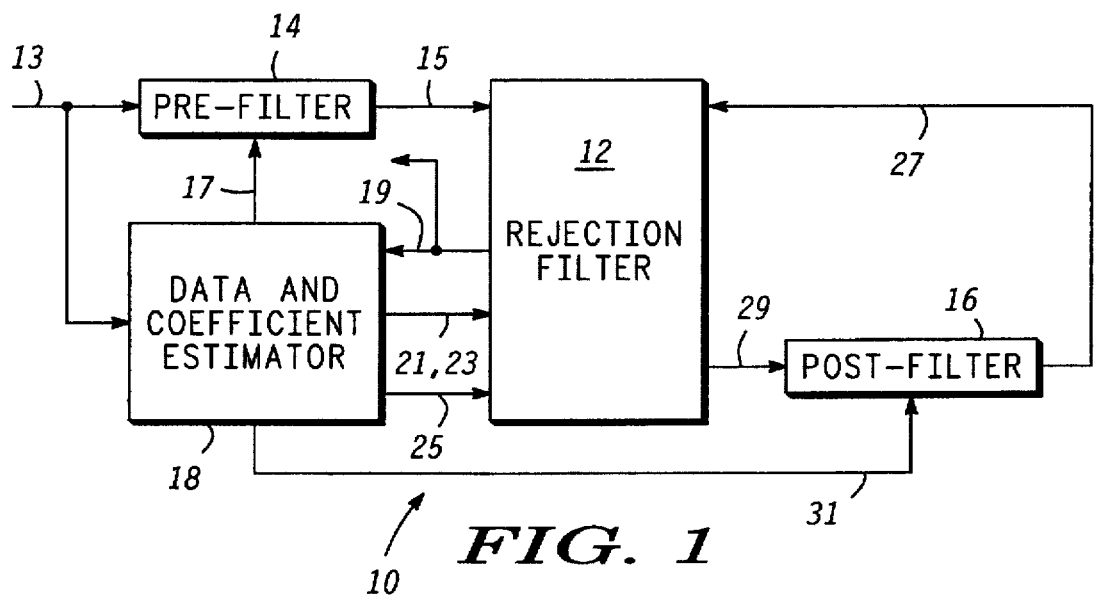
In FIG. 1, there is shown a simplified block diagram of an adaptive interference canceling filter in accordance with a preferred embodiment of the invention.

In particular, in FIG. 1 there is shown a simplified block diagram of an adaptive interference canceling filter 10 in accordance with a preferred embodiment of the invention. This adaptive interference canceling filter 10 can be used to improve the performance of a communication system in the presence of interference through the use of nonlinear adaptive filtering. For example, the adaptive interference canceling filter can be employed within a communication device 5, which, for example, may be a radio, modem, or local area network transceiver. The use of a nonlinear structure permits improved rejection of interference without a corresponding degradation in signal quality due to induced distortion in the form of added inter-symbol interference.

The unfiltered signal 13 is processed by pre-filter 14 to generate a pre-filtered signal 15. The primary role of the pre-filter 14 is to perform channelization of the signal and match filtering required to improve the signal-to-noise ratio of the signal. Several types of filters which are widely available can be used, including fixed surface acoustic wave (SAW) filters, fixed lumped element filters, digital finite impulse response (FIR) filters, or digital infinite impulse response (IIR) filters. In a preferred embodiment, pre-filter 14 is an adaptive transversal equalizer of length L in order to provide an optimum match filter in a dynamic channel environment. Tap weights of pre-filter 14, which define the filter parameters and which can be pre-filter linear tap weights 17, are provided by the data and coefficient estimator 18, which also receives unfiltered signal 13.

Rejection filter 12 receives pre-filtered signal 15 from the pre-filter 14, the post filtered signal 27 from post-filter 16, and data decisions 25 from the data and coefficient estimator 18 and through the use of non-linear filtering generates the filtered signals. The linear tap weights 21 and decision tap weights 23 for the rejection filter 12, which define rejection filter characteristics, are provided by the data and coefficient estimator 18.

The performance of the adaptive filter 10 in FIG. 1 is improved through the addition of post-filter 16. Post-filter 16 receives delayed data decisions 29 from the rejection filter 12 and generates a post-filtered signal 27 which is routed to the rejection filter 12. In a preferred embodiment, post-filter 16 is an adaptive decision feedback equalizer type filter of length N with post-filter 15 decision tap weights 31 set by the data and coefficient estimator 18. Other implementations can also be used, including the use of the adaptive filter 10 without post-filter 16, and through the use of a non-adaptive FIR filter or other alternative adaptive or fixed filtering approach. The data and coefficient estimator 18 receives the unfiltered signal 13, and the filtered signal 19 in order to make data decisions and to provide tap weights to the pre-filter 14, post-filter 16 and rejection filter 12.

Figure 2:
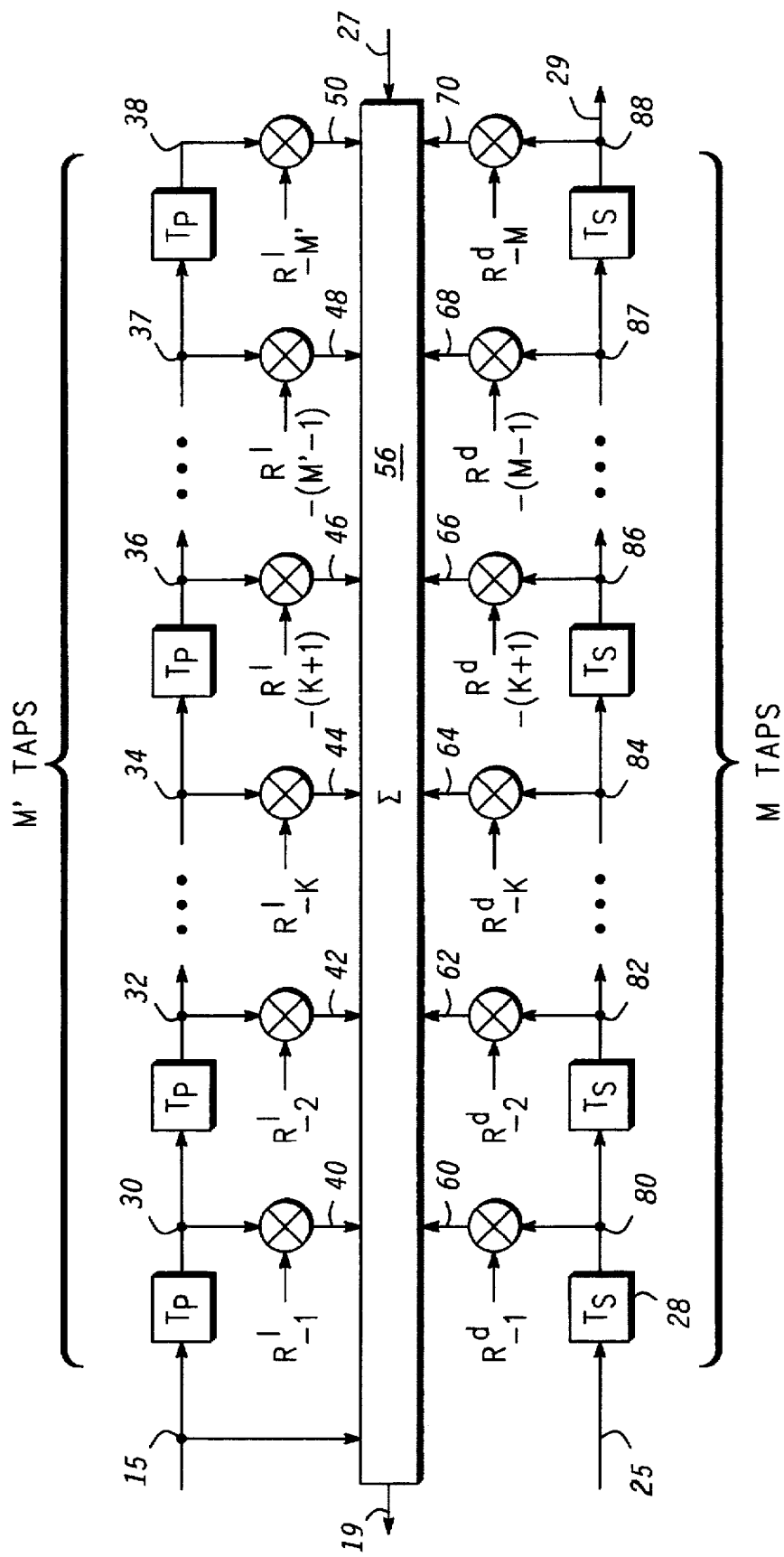
In FIG. 2, there is shown a block diagram of a rejection filter for use in an adaptive interference canceling filter such as that of FIG. 1.

In FIG. 2, there is shown a preferred embodiment of the rejection filter 12 of FIG. 1. The rejection filter 12 combines overlapping (i.e. time aligned) versions of the pre-filtered signal 15 and data decisions 25. In addition, the rejection filter 12 is used to sum in a post filtered signal 27, resulting in the filtered signal 19 presented to the data and coefficient estimator 18 (see FIG. 1). In order to implement the first overlapping decision tap 80 in FIG. 2, the data decisions 25 must correspond to the same time instant as the filtered signal 19 provided by the rejection filter 12 to the data and coefficient estimator 18. Since the data and coefficient estimator 18 cannot determine a rejection filter decision without some delay, delay register 28 is used prior to the first overlapping decision tap 80 to permit the decision to be calculated with some delay, up to but not including one symbol period.

Rejection filter 12 in FIG. 2 comprises a linear portion and a non-linear portion. The linear portion is made up of tap delay line with taps 30, 32, 34, 36, 37, and 38 shown as representative of M' taps. Each of taps 30,32, 34, 36, 37, and 38 is weighted with a corresponding linear tap weight of the rejection filter linear tap weights 21 provided by data and coefficient estimator 18. Weighting is performed using a multiplier for each tap shown, where each multiplier may be either a complex multiplier or linear multiplier depending upon the signal being processed. The rejection filter linear tap weight which is input to the first multiplier for the M' taps along with a delayed version of the pre-filtered signal 15 from tap 30 is denoted $R_{-1}{}^l$, where the 1 signifies linear tap weights. Similarly, the rejection filter linear tap weight which is input to the second multiplier along with a delayed version of the pre-filtered signal 15 from tap 32 is denoted $R_{-2}{}^l$, the rejection filter linear tap weight which is input to the kth multiplier shown in FIG. 2 along with a delayed version of the pre-filtered signal from tap 34 is denoted $R_{-k}{}^l$, and so on, up through the rejection filter linear tap weight which is input to the last multiplier 50 along with a delayed version of the pre-filtered signal from tap 38, which is denoted $R_{-M'}{}^l$. An arbitrary delay, $T_p$, is used with a one-half symbol delay in the preferred embodiment of FIG. 2 before the first tap 30 and additionally for each succeeding tap 32, 34, 36, 37 and 38. Use of a smaller delay may provide superior results at the expense of additional components. Each of the resulting weighted signals 40, 42, 44, 46, 48, and 50 output from the multipliers for the M' taps is summed with the post-filter signal 27 by summer 56.

Alternatively, the FIG. 2 rejection filter 12 can be viewed as comprising a plurality of combined signal delay and tap elements coupled in series, wherein the pre-filtered signal 15 input at a first end of the plurality of combined signal delay and tap elements produces a plurality of delayed signals at each tap (30, 32, 34, 36, 37, 38) of the plurality of combined signal delay and tap elements. A first plurality of multipliers is coupled to each tap (30, 32, 34, 36, 37, 38) of the plurality of combined signal delay and tap elements and the first plurality of multipliers receive the plurality of delayed signals and the rejection filter linear tap weights (21) and produce a first plurality of weighted signals (40, 42, 44, 46, 48, 50). In addition, the FIG. 2 rejection filter 12 includes a plurality of combined decision delay and tap elements coupled in series, wherein the data decisions (25) input at a first end of the plurality of combined decision delay and tap elements produces a plurality of delayed data decisions at each tap (80, 82, 84, 86, 87, 88) of the plurality of combined decision delay and tap elements; A second plurality of multipliers coupled to each tap (80, 82, 84, 86, 87, 88) of the plurality of combined decision delay and tap elements receives the plurality of delayed data decisions and the rejection filter decision tap weights and produce a second plurality of weighted signals (60, 62, 64, 66, 68, 70). A summing node (summer 56) is coupled to the first and second plurality of multipliers, the summing node for combining the first and second pluralities of weighted signals to produce a filtered signal.

The nonlinear portion of rejection filter 12 in FIG. 2 processes data decisions which have been generated via a nonlinear operation. Each of taps 80, 82, 84, 86, 87, and 88 is representative of M taps and is weighted with a corresponding decision tap weight of the rejection filter decision tap weights 23 provided by data and coefficient estimator 18. Weighting is performed using a multiplier for each tap shown, where each multiplier may be either a complex multiplier or linear multiplier depending upon the signal being processed. The rejection filter decision tap weight which is input to the first multiplier for the M taps along with delayed data decisions of the data decisions 25 from tap 80 is denoted $R_{-1}{}^d$, where the d signifies decision tap weights. Similarly, the rejection filter linear tap weight which is input to the second multiplier along with delayed data decisions of the data decisions 25 from tap 82 is denoted $R_{-2}{}^d$, the rejection filter linear tap weight which is input to the kth multiplier shown in FIG. 2 along with delayed data decisions of the data decisions 25 from tap 84 is denoted $R_{-k}{}^d$, and so on, up through the rejection filter decision tap weight which is input to the last multiplier 70 along with delayed data decisions of the data decisions 25 from tap 88, which is denoted $R_{-M}{}^d$. The delay used, $T_s$, should be set to a symbol period to match the rate at which data decisions 25 are generated. Each of the resulting weighted decisions 60, 62, 64, 66, 67, 68, and 70 output from the multipliers of the M taps is summed together with the post-filter signal 27 to form the filtered signal 19. The relationship between the delays $T_s$ and $T_p$ and the numbers of taps is $(T_s/T_p) \times M = M'$ taps.

Figure 3:
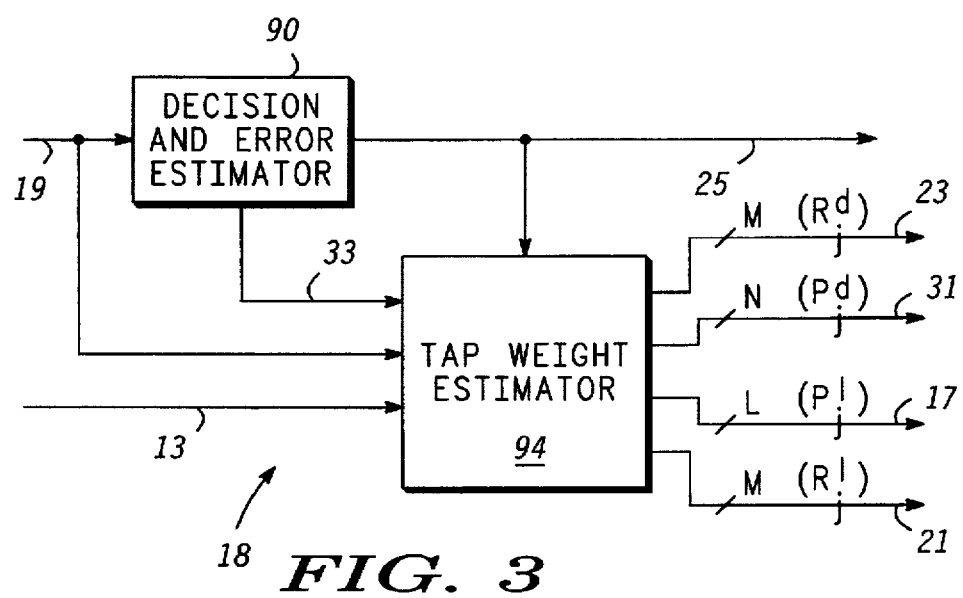
In FIG. 3, there is shown a block diagram of the data and coefficient estimator for use in an adaptive interference canceling filter such as that of FIG. 1.

FIG. 3 illustrates a preferred embodiment of the data and coefficient estimator 18 for use in the FIG. 1 adaptive interference canceling filter 10. Filtered signal 19 is received by the decision and error estimator 90 in FIG. 3, and data decisions 25 and decision errors 33 are generated. The decision errors 33, the differences between the filtered signal 19 and data decision levels 25 are sent to the tap weight estimator 94. The decision and error estimator 90 can be constructed by any one of a number of well known methods depending upon signal type, including a random access memory (RAM) lookup table, digital logic, or analog comparators.

The tap weight estimator 94 shown in FIG. 3 receives the filtered signal 19, decision errors 33 from the decision and error estimator 90, and the unfiltered signal 13. From these input signals, the following sets of tap weights are calculated: rejection filter decision tap weights 23 ($R_j{}^d$), post-filter decision tap weights 31 ($P_j{}^d$), pre-filter linear tap weights 17 ($P_j{}^l$), and rejection filter linear tap weights 21 ($R_j{}^l$). Any number of algorithms can be used to calculated the tap weights including the well known constant modulus algorithm (CMA), least means square (LMS), zero forcing (ZF), and other steepest descent algorithms. In a preferred embodiment, a LMS algorithm is used for setting the pre-filter linear tap weights 17 and rejection filter linear tap weights 21, while a zero forcing algorithm is used to calculate the rejection filter decision tap weights 23, and post-filter decision tap weights 31.

FIG. 4 illustrates a block diagram of a preferred embodiment of pre-filter 14 for use in the FIG. 1 adaptive interference canceling filter 10. Pre-filter 14 uses a classical transversal equalizer strupassed the unfiltered signal 13 is passed through a tapped delay line, made up of L taps, with representative taps shown as labeled taps 100, 102, 104, 106, 107, 108, and 109. Each of taps 100, 102, 104, 106, 107, 108, and 109 is weighted by an appropriate pre-filter linear tap weight of the pre-filter linear tap weights 17.

Weighting is performed in FIG. 4 using a multiplier for each tap shown. The pre-filter linear tap weight which is input to the first multiplier for the L taps along with the unfiltered signal 13 from tap 100 is denoted $P_L^1$. Similarly, the pre-filter linear tap weight which is input to the second multiplier along with a delayed version of the unfiltered signal 13 from tap 102 is denoted $P_{L-1}^1$, the pre-filter linear tap weight which is input to the third multiplier along with a delayed version of the unfiltered signal 13 from tap 104 is denoted $P_{L-2}^1$, and so on, up through the pre-filter linear tap weight which is input to the last multiplier 122 along with a delayed version of the unfiltered signal 13 from tap 109 and is denoted $P_{L-1}^1$. The arbitrary delay, $T_p$, is used with a one-half symbol delay in the preferred embodiment of FIG. 4 before the second tap 102 and additionally for each succeeding tap 104, 106, 107, 108, and 109. Each of the resulting weighted, unfiltered signals 110, 112, 114, 116, 118, 120, and 122 output from the multipliers for the L taps are then summed by summer 126 to generate the pre-filtered signal 15.

Alternatively, FIG. 4 can be viewed as a pre-filter 14 including a plurality of unfiltered signal delay elements comprising a plurality of taps 100, 102, 104, 106, 107, 108 for providing a plurality of delayed signals corresponding to the plurality of taps 100, 102, 104, 106, 107, 108. A plurality of multipliers is coupled to the plurality of unfiltered signal delay elements to selectively weight the plurality of delayed signals to produce a plurality of weighted signals (110, 112, 114, 116, 118, 120). A summing node (summer 126) is coupled to the plurality of multipliers for combining the plurality of weighted signals 110, 112, 114, 116, 118, 120 to produce a pre-filtered signal 15.

Figure 5:
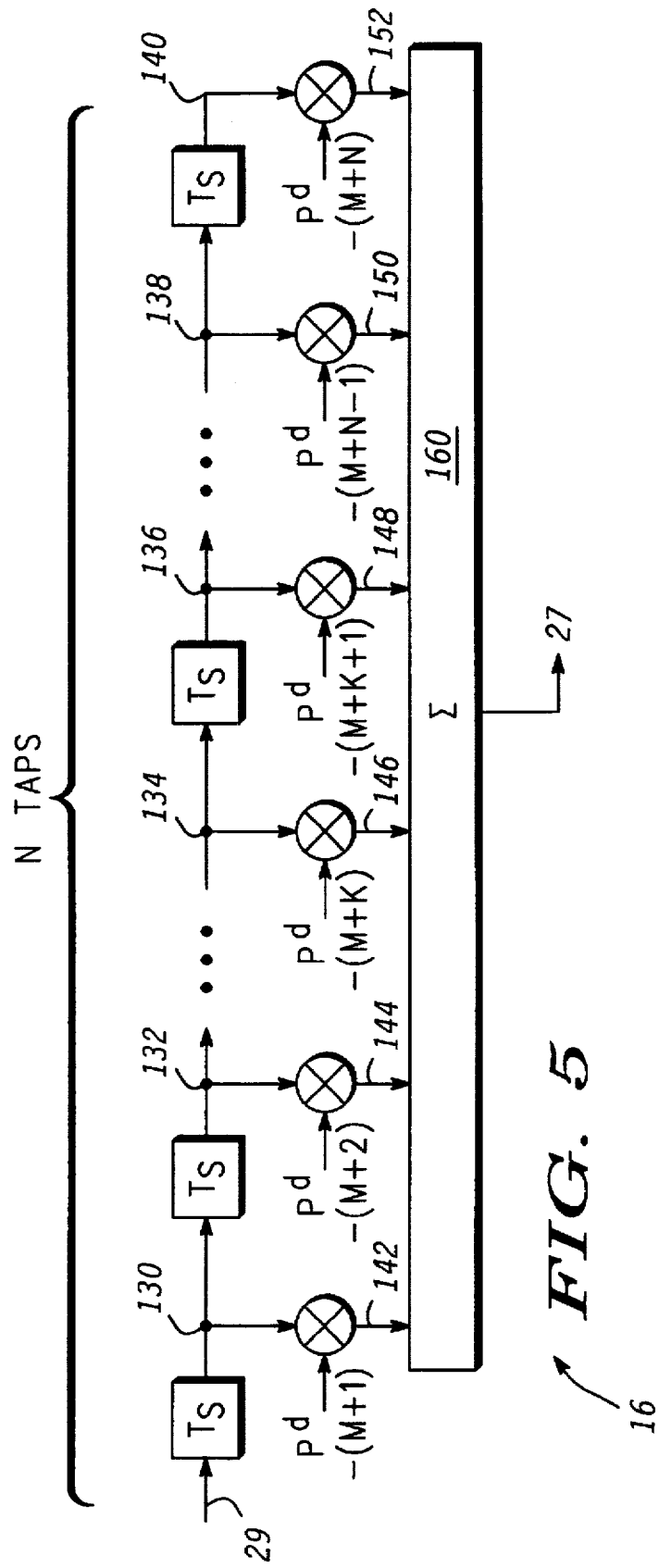
In FIG. 5, there is shown a block diagram of the post-filter for use in an adaptive interference canceling filter such as that of FIG. 1.

In FIG. 5, there is shown a block diagram of the preferred embodiment of post filter 16 for use in the FIG. 1 adaptive interference canceling filter 10. Delayed data decisions 29 from the rejection filter 12 are passed through a tapped delay line of N taps, including representative taps 130, 132, 134, 136, 138, and 140. Delayed data decisions 29 are used to ensure that there is no overlap between the linear portion of the rejection filter 12 and the decisions present at taps 130, 132, 134, 136, 138, and 140 (see the FIG. 1 adaptive interference canceling filter 10). These delayed data decisions 29 are weighted by appropriate post-filter decision tap weights 31. The post-filter decision tap weight which is input to the first multiplier for the N taps along with the delayed data decisions 29 from tap 130 is denoted $P_{-(M+1)}^d$. Similarly, the post-filter decision tap weight which is input to the second multiplier for the N taps along with further delayed delayed data decisions 29 from tap 132 is denoted $P_{-(M+2)}^d$, the post-filter decision tap weight which is input to the third multiplier for the N taps along with further delayed delayed data decisions 29 from tap 134 is denoted $P_{-(M+k)}^d$, and so on, up through the post-filter decision tap weight which is input to the last multiplier for the N taps along with further delayed delayed data decisions 29 from tap 140 is denoted $P_{-(M+N)}^d$. The delay, $T_p$, is used with a one symbol delay in the preferred embodiment of FIG. 4 before the first tap 130 and additionally for each succeeding tap 132, 134, 136, 138, and 140. Each of the resulting weighted decisions 142, 144, 146, 148, 150 and 152 are summed by summer 160 to generate the post-filtered signal 27.

Figure 6:
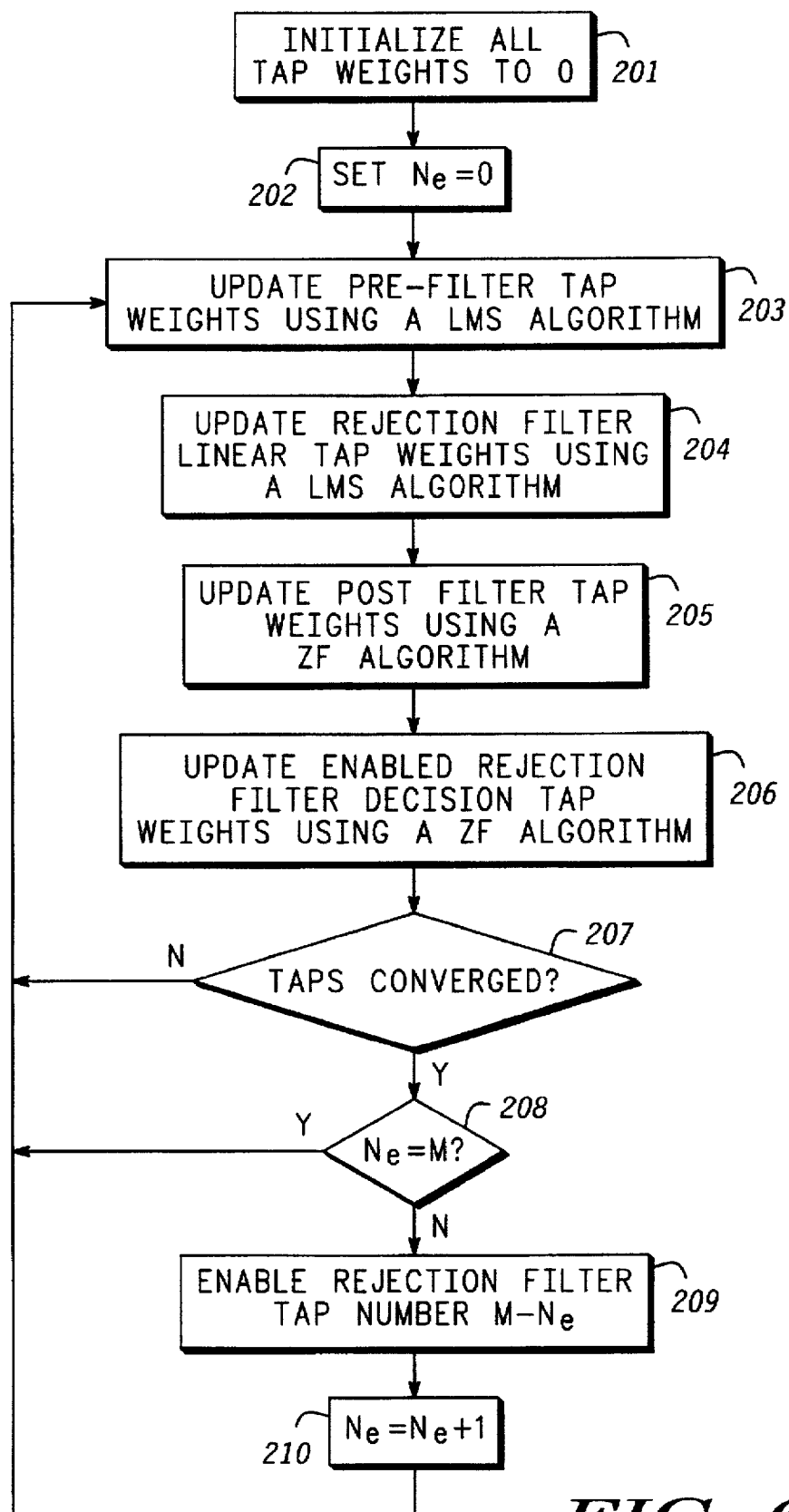
In FIG. 6, there is shown a flow chart of a method for setting the tap weights of an adaptive interference canceling filter in accordance with a preferred embodiment of the invention; and In FIG. 7, there is shown a performance simulation, as generated by a simulation computer program, of the adaptive interference canceling filter as shown in FIG. 1.

The structure of the rejection filter 12 shown in FIGS. 1 and 2 has an increased number of degrees of freedom and therefore requires assistance in converging to a stable condition that exhibits a performance improvement. FIG. 6 shows a preferred embodiment of a method that ensures that this converging condition occurs. Several other methods are possible, but all of these approaches are variations of controlling individual tap gains in a sequence that reduces the degrees of freedom and thereby forces the equalizer to converge in a controlled fashion.

A method of setting tap weights in an adaptive filter to provide interference cancellation and convergence to a stable condition can be described as including the steps of initializing tap weights, initializing a count of decision taps in a rejection filter, updating pre-filter taps, post-filter taps, and rejection filter linear taps, updating decision taps in the rejection filter, determining whether updated taps have converged, determining whether all decision taps in the rejection filter have been enabled, enabling an additional rejection filter decision tap, and incrementing the count of decision taps in the rejection filter.

More particularly, referring to FIG. 6, in Step 201, an equalizer is initialized by setting all tap weights in the pre-filter, rejection filter and post-filter to zero, with the exception of a center tap. For example, a center tap in a preferred embodiment can be tap 109 in FIG. 4. (Other initialization procedures are feasible, such as setting tap weights to some fixed values other than zero (i.e., the channel is known a priori) and certainly, if the pre-filter and post-filter are implemented as non-adaptive filter structures then there will be no need to initialize these filters.)

In Step 202 of FIG. 6, the number of enabled rejection filter decision taps, $N_e$, is set to zero. This step essentially disables all of the rejection filter taps such that as the adaptive method proceeds, disabled taps will remain with a tap weight of zero.

Step 203 of FIG. 6 updates the pre-filter tap weights using a least mean square (LMS) algorithm. This step would not be required if the pre-filter were not adaptive. Step 204 updates the rejection filter linear tap weights using an LMS algorithm.

Step 205 of FIG. 6 updates the post-filter tap weights using a zero forcing (ZF) algorithm. Again, if the post-filter is not adaptive, this step will not be needed.

Step 206 of FIG. 6 updates the rejection filter decision tap weights. It is important to note that only the rejection filter tap weights that are enabled will be updated during this step therefore, initially, no rejection filter tap weights will be updated (i.e. they will remain zero) and the entire filter structure will converge with only the pre-filter, the linear portion of the rejection filter and the post-filter which is basically a conventional equalizer structure.

Step 207 of FIG. 6 makes a decision as to whether or not the enabled taps have adequately converged to a steady state condition. This decision may be based on some form of measurement of the tap movement or simply a fixed amount of time may be allowed to pass based on the known time constants of the adaptive taps. If the taps have not converged, the algorithm returns to Step 203, forming a loop that repetitively updates all enabled taps.

If the taps have converged to a steady state, the method moves to Step 208 of FIG. 6, which determines whether all of the rejection filter decision taps have been enabled (i.e., does $N_e=M$?). If all of the rejection filter decision taps have been enabled, the algorithm returns to Step 203 and the adaptive method has reached its steady state, continually updating all of the taps in the filter structure. If all of the rejection filter decision taps have not been enabled (e.g., after the conventional structure has converged with $N_e=0$), then the method proceeds to Step 209.

Step 209 of FIG. 6 enables the ($M-N_e$) rejection filter decision tap. For example, after convergence of the conventional structure with $N_e=0$, the first rejection filter decision tap to be enabled will be tap $M-0=M$ or tap 70 in FIG. 2.

Step 210 increments the count of the number of enabled rejection filter decision taps ($N_e$) and the procedure returns to Step 203. Thus, a preferred embodiment of the adaptive method enables one rejection filter decision tap at a time and allows the structure to converge to a steady state solution before enabling the next tap. The rejection filter decision tap to be enabled is always the tap having the longest delay of the taps currently not enabled. Such a method controls the degree of freedom of the filter and ensures that the structure converges to a stable condition.

The superior ability of this method and apparatus for adaptive interference canceling to operate in the presence of interference was demonstrated using a simulation written using the computer program SPW, which is commercially available from Alta Group of Cadence Design Systems, Inc., Foster City, Calif. The simulation was used to demonstrate the capability of a 16 tap, T/2 spaced pre-filter, combined with a rejection filter having 16 linear taps spaced at T/2 and 8 decision taps spaced at T, where T is a symbol period. No post-filter was used for this simulation. The tap weights were adapted as previously described, and the improvement as measured as the reduction of Eb/No permitted due to the use of the invention over a conventional 16 tap T/2 transversal equalizer was measured.

Figure 7:
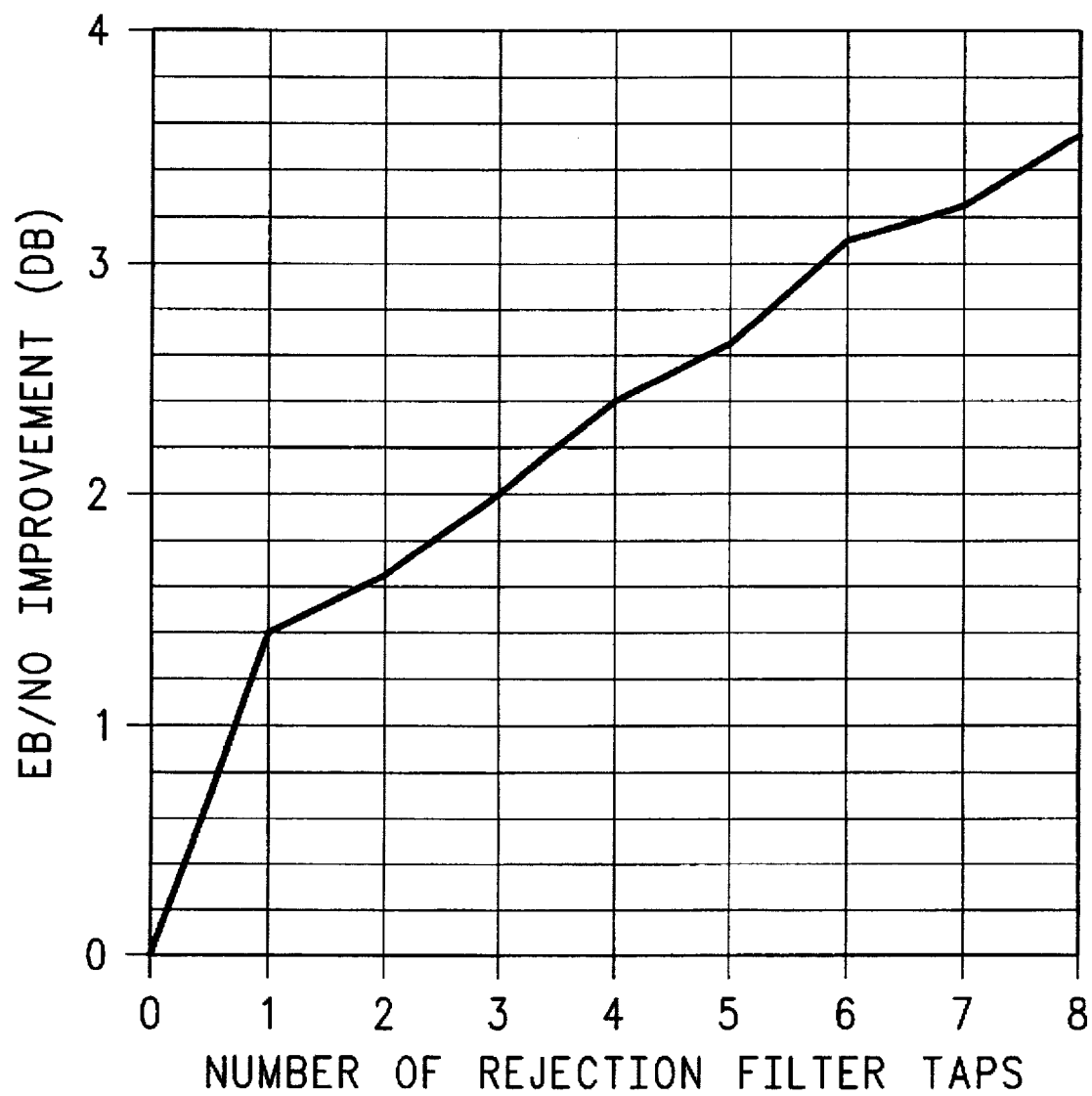

The results of the simulation are summarized in FIG. 7. An improvement of 3.5 decibels (dB) was demonstrated over a conventional adaptive filter with all decision taps enabled. Such performance would permit a user of such a communication system to transmit at half the power or transmit twice the data rate over a conventional system. FIG. 7 also demonstrates that significant improvement can be achieved without using all the decision taps. This may be required, for example, if the decision and coefficient estimator delay exceeded one symbol. For example, if the first tap is disabled, the simulation demonstrates 3 dB improvement over a conventional adaptive equalizer.

Thus, the present invention overcomes the limitations of conventional adaptive filtering techniques in high interference environments by canceling distortion added in the process of excising the interference, and thus permitting a greater reduction in interference power, improving signal quality.

What is claimed is:

1. An adaptive filter apparatus for removing interfering signals from an unfiltered signal, the adaptive filter apparatus comprising:

a pre-filter for receiving pre-filter linear tap weights and the unfiltered signal and generating a pre-filtered signal therefrom;

a rejection filter coupled to the pre-filter, the rejection filter for receiving the pre-filtered signal, rejection filter linear and decision tap weights, data decisions, and a post-filter signal, removing the interfering signals and canceling distortion, and generating a filtered signal and delayed data decisions;

a post-filter coupled to the rejection filter, the post-filter for receiving post-filter decision tap weights and the delayed data decisions and generating the post-filter signal therefrom; and a data and coefficient estimator coupled to the pre-filter, to the rejection filter, and to the post-filter, the data and coefficient estimator for receiving the filtered signal and the unfiltered signal and generating the data decisions, the rejection filter linear and decision tap weights and the pre-filter linear tap weights.

2. An adaptive filter apparatus as claimed in claim 1, wherein the rejection filter comprises:

a plurality of combined signal delay and tap elements coupled in series, wherein the pre-filtered signal input at a first end of the plurality of combined signal delay and tap elements produces a plurality of delayed signals at each tap of the plurality of combined signal delay and tap elements;

a first plurality of multipliers coupled to each tap of the plurality of combined signal delay and tap elements, wherein the first plurality of multipliers receive the plurality of delayed signals and the rejection filter linear tap weights and produce a first plurality of weighted signals therefrom;

a plurality of combined decision delay and tap elements coupled in series, wherein the data decisions input at a first end of the plurality of combined decision delay and tap elements produces a plurality of delayed data decisions at each tap of the plurality of combined decision delay and tap elements;

a second plurality of multipliers coupled to each tap of the plurality of combined decision delay and tap elements, wherein the second plurality of multipliers receive the plurality of delayed data decisions and the rejection filter decision tap weights and produce a second plurality of weighted signals therefrom; and a summing node coupled to the first and second plurality of multipliers, the summing node for combining the first and second pluralities of weighted signals to produce a filtered signal.

3. An adaptive filter apparatus as claimed in claim 1, wherein the data and coefficient estimator comprises:

a decision and error estimator for receiving the filtered signal and for generating decision errors and the data decisions therefrom; and a tap weight estimator coupled to the decision and error estimator, the tap weight estimator for receiving the data decisions, the filtered signal, the unfiltered signal and the decision errors and for generating the rejection filter linear and decision tap weights, the post-filter decision tap weights, and the pre-filter linear tap weights.

4. An adaptive filter apparatus as claimed in claim 1, wherein the pre-filter comprises:

a plurality of unfiltered signal delay elements comprising a plurality of taps for providing a plurality of delayed signals corresponding to the plurality of taps;

a plurality of multipliers coupled to the plurality of unfiltered signal delay elements, the plurality of multipliers for selectively weighting the plurality of delayed signals to produce a plurality of weighted signals; and a summing node coupled to the plurality of multipliers, the summing node for combining the plurality of weighted signals to produce a pre-filtered signal.

5. An adaptive filter apparatus as claimed in claim 1, wherein the post-filter comprises:

a plurality of decision delay elements comprising a plurality of taps for providing a plurality of delayed data decisions corresponding to the plurality of taps;

a plurality of multipliers coupled to the plurality of decision delay elements, the plurality of multipliers for selectively weighting the plurality of delayed data decisions to produce a plurality of weighted decisions; and a summing node coupled to the plurality of multipliers, the summing node for combining the plurality of weighted decisions to produce a post-filtered signal.

6. A radio including an adaptive filter comprising:

a pre-filter for receiving pre-filter linear tap weights and an unfiltered signal and generating a pre-filtered signal therefrom;

a rejection filter coupled to the pre-filter, the rejection filter for receiving the pre-filtered signal, rejection filter linear and decision tap weights, data decisions, and a post-filter signal, removing the interfering signals and canceling distortion, and generating a filtered signal and delayed data decisions;

a post-filter coupled to the rejection filter, the post-filter for receiving post-filter decision tap weights and the delayed data decisions and generating the post-filter signal therefrom; and a data and coefficient estimator coupled to the pre-filter, to the rejection filter, and to the post-filter, the data and coefficient estimator for receiving the filtered signal and the unfiltered signal and generating the data decisions, the rejection filter linear and decision tap weights and the pre-filter linear tap weights.

7. A radio including an adaptive filter as claimed in claim 6, wherein the rejection filter comprises:

a plurality of combined signal delay and tap elements coupled in series, wherein a pre-filtered signal input at a first end of the plurality of combined signal delay and tap elements produces a plurality of delayed signals at each tap of the plurality of combined signal delay and tap elements;

a first plurality of multipliers coupled to each tap of the plurality of combined signal delay and tap elements, wherein the first plurality of multipliers receive the plurality of delayed signals and the rejection filter linear tap weights and produce a first plurality of weighted signals therefrom;

a plurality of combined decision delay and tap elements coupled in series, wherein the data decisions input at a first end of the plurality of combined decision delay and tap elements produces a plurality of delayed data decisions at each tap of the plurality of combined decision delay and tap elements;

a second plurality of multipliers coupled to each tap of the plurality of combined decision delay and tap elements, wherein the second plurality of multipliers receive the plurality of delayed data decisions and the rejection filter decision tap weights and produce a second plurality of weighted signals therefrom; and a summing node coupled to the first and second plurality of multipliers, the summing node for combining the first and second pluralities of weighted signals to produce a filtered signal.

8. A radio including an adaptive filter as claimed in claim 6, wherein the data and coefficient estimator comprises:

a decision and error estimator for receiving the filtered signal and for generating decision errors and the data decisions therefrom; and a tap weight estimator coupled to the decision and error estimator, the tap weight estimator for receiving the data decisions, the filtered signal, the unfiltered signal and the decision errors and for generating the rejection filter linear and decision tap weights, the post-filter decision tap weights, and the pre-filter linear tap weights.

9. A modem including an adaptive filter comprising:

a pre-filter for receiving pre-filter linear tap weights and an unfiltered signal and generating a pre-filtered signal therefrom;

a rejection filter coupled to the pre-filter, the rejection filter for receiving the pre-filtered signal, rejection filter linear and decision tap weights, data decisions, and a post-filter signal, removing interfering signals and canceling distortion, and generating a filtered signal and delayed data decisions;

a post-filter coupled to the rejection filter, the post-filter for receiving post-filter decision tap weights and the delayed data decisions and generating the post-filter signal therefrom; and a data and coefficient estimator coupled to the pre-filter, to the rejection filter, and to the post-filter, the data and coefficient estimator for receiving the filtered signal and the unfiltered signal and generating the data decisions, the rejection filter linear and decision tap weights and the pre-filter linear tap weights.

10. A modem including an adaptive filter as claimed in claim 9, wherein the rejection filter comprises:

a plurality of combined signal delay and tap elements coupled in series, wherein the pre-filtered signal input at a first end of the plurality of combined signal delay and tap elements produces a plurality of delayed signals at each tap of the plurality of combined signal delay and tap elements;

a first plurality of multipliers coupled to each tap of the plurality of combined signal delay and tap elements, wherein the first plurality of multipliers receive the plurality of delayed signals and the rejection filter linear tap weights and produce a first plurality of weighted signals therefrom;

a plurality of combined decision delay and tap elements coupled in series, wherein the data decisions input at a first end of the plurality of combined decision delay and tap elements produces a plurality of delayed data decisions at each tap of the plurality of combined decision delay and tap elements;

a second plurality of multipliers coupled to each tap of the plurality of combined decision delay and tap elements, wherein the second plurality of multipliers receive the plurality of delayed data decisions and the rejection filter decision tap weights and produce a second plurality of weighted signals therefrom; and a summing node coupled to the first and second plurality of multipliers, the summing node for combining the first and second pluralities of weighted signals to produce a filtered signal.

11. A radio including an adaptive filter as claimed in claim 9, wherein the data and coefficient estimator comprises:

a decision and error estimator for receiving the filtered signal and for generating decision errors and the data decisions therefrom; and a tap weight estimator coupled to the decision and error estimator, the tap weight estimator for receiving the data decisions, the filtered signal, the unfiltered signal and the decision errors and for generating the rejection filter linear and decision tap weights, the post-filter decision tap weights, and the pre-filter linear tap weights.

12. A local area network transceiver including an adaptive filter comprising:

a pre-filter for receiving pre-filter linear tap weights and an unfiltered signal and generating a pre-filtered signal therefrom;

a rejection filter coupled to the pre-filter, the rejection filter for receiving the pre-filtered signal, rejection filter linear and decision tap weights, data decisions, and a post-filter signal, removing the interfering signals and canceling distortion, and generating a filtered signal and delayed data decisions;

a post-filter coupled to the rejection filter, the post-filter for receiving post-filter decision tap weights and the delayed data decisions and generating the post-filter signal therefrom; and a data and coefficient estimator coupled to the pre-filter, to the rejection filter, and to the post-filter, the data and coefficient estimator for receiving the filtered signal and the unfiltered signal and generating the data decisions, the rejection filter linear and decision tap weights and the pre-filter linear tap weights.

13. A local area network transceiver including an adaptive filter as claimed in claim 12, wherein the rejection filter comprises:

a plurality of combined signal delay and tap elements coupled in series, wherein the pre-filtered signal input at a first end of the plurality of combined signal delay and tap elements produces a plurality of delayed signals at each tap of the plurality of combined signal delay and tap elements;

a first plurality of multipliers coupled to each tap of the plurality of combined signal delay and tap elements, wherein the first plurality of multipliers receive the plurality of delayed signals and the rejection filter linear tap weights and produce a first plurality of weighted signals therefrom;

a plurality of combined decision delay and tap elements coupled in series, wherein the data decisions input at a first end of the plurality of combined decision delay and tap elements produces a plurality of delayed data decisions at each tap of the plurality of combined decision delay and tap elements;

a second plurality of multipliers coupled to each tap of the plurality of combined decision delay and tap elements, wherein the second plurality of multipliers receive the plurality of delayed data decisions and the rejection filter decision tap weights and produce a second plurality of weighted signals therefrom; and a summing node coupled to the first and second plurality of multipliers, the summing node for combining the first and second pluralities of weighted signals to produce a filtered signal.

14. A local area network transceiver including an adaptive filter as claimed in claim 12, wherein the data and coefficient estimator comprises:

a decision and error estimator for receiving the filtered signal and for generating decision errors and the data decisions therefrom; and a tap weight estimator coupled to the decision and error estimator, the tap weight estimator for receiving the data decisions, the filtered signal, the unfiltered signal and the decision errors and for generating the rejection filter linear and decision tap weights, the post-filter decision tap weights, and the pre-filter linear tap weights.

15. A method of setting tap weights in an adaptive filter to provide interference cancellation and convergence to a stable condition, the method comprising the steps of:

initializing the tap weights;

initializing a count of decision taps in a rejection filter;

updating pre-filter taps, post-filter taps, and rejection filter linear taps;

updating decision taps in the rejection filter;

determining whether updated taps have converged;

determining whether all decision taps in the rejection filter have been enabled;

enabling an additional rejection filter decision tap; and incrementing the count of decision taps in the rejection filter.

* * * * *